United States Patent
Sica et al.

(10) Patent No.: US 10,930,414 B2
(45) Date of Patent: Feb. 23, 2021

(54) METHOD FOR EXTRACTING CROSSLINKING BY-PRODUCTS FROM A CROSSLINKED ELECTRICALLY INSULATING SYSTEM OF A POWER CABLE AND RELATED POWER CABLE

(71) Applicant: Prysmian S.p.A., Milan (IT)

(72) Inventors: Rodolfo Sica, Milan (IT); Alessandro Rolla, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 16/791,199

(22) Filed: Feb. 14, 2020

(65) Prior Publication Data

US 2020/0273604 A1 Aug. 27, 2020

(30) Foreign Application Priority Data

Feb. 22, 2019 (IT) .......................... 102019000002609

(51) Int. Cl.
| | |
|---|---|
| *H01B 9/02* | (2006.01) |
| *H01B 3/12* | (2006.01) |
| *H01B 3/44* | (2006.01) |
| *H01B 13/00* | (2006.01) |

(52) U.S. Cl.
CPC ............... *H01B 9/027* (2013.01); *H01B 3/12* (2013.01); *H01B 3/441* (2013.01); *H01B 13/0016* (2013.01); *H01B 13/0036* (2013.01)

(58) Field of Classification Search
CPC .................................... H01B 7/02; H01B 9/02
USPC ...................... 174/74 R–84 R, 110 R–120 SC
See application file for complete search history.

(56) References Cited

U.S. PATENT DOCUMENTS

| | | | |
|---|---|---|---|
| 6,005,192 A | 12/1999 | Mashikian et al. | |
| 6,383,634 B1 | 5/2002 | Kornfeldt et al. | |
| 8,192,813 B2 * | 6/2012 | Runyan | B32B 1/08 |
| | | | 428/35.7 |
| 8,211,968 B2 * | 7/2012 | Yang | C08L 23/16 |
| | | | 524/491 |

(Continued)

FOREIGN PATENT DOCUMENTS

| | | |
|---|---|---|
| GB | 2 464 610 A | 4/2010 |
| GB | 2 513 991 A | 11/2014 |

(Continued)

OTHER PUBLICATIONS

Search Report in corresponding Italian Application No. 201900002609, dated Oct. 24, 2019.

(Continued)

*Primary Examiner* — William H. Mayo, III
(74) *Attorney, Agent, or Firm* — Finnegan, Henderson, Farabow, Garrett & Dunner, L.L.P.

(57) ABSTRACT

An energy cable comprises at least one cable core comprising an electric conductor, a crosslinked electrically insulating layer, and particles of a zeolite system comprising at least a first zeolite and a second zeolite placed in the cable core. A method for extracting crosslinking by-products from a cross-linked electrically insulating layer of an energy cable core comprises manufacturing the energy cable core comprising particles of the above-said zeolite system, heating the energy cable core up to a temperature causing migration of the crosslinking by-products from the crosslinked electrically insulating layer, and placing a metal screen around the energy cable core.

14 Claims, 1 Drawing Sheet

(56) References Cited

U.S. PATENT DOCUMENTS

| | | | |
|---|---|---|---|
| 8,389,615 B2* | 3/2013 | Tse | C08L 23/10 |
| | | | 524/474 |
| 8,513,347 B2* | 8/2013 | Tse | C08L 23/18 |
| | | | 524/474 |
| 9,129,721 B2* | 9/2015 | Liu | H01B 7/02 |
| 9,214,261 B2* | 12/2015 | Saito | H01B 9/027 |
| 9,991,690 B2* | 6/2018 | Boffi | H01B 3/006 |
| 10,325,694 B2* | 6/2019 | Sica | H01L 31/022425 |
| 10,361,010 B2* | 7/2019 | Sica | H01B 13/22 |
| 10,672,539 B2* | 6/2020 | Kim | H01B 9/02 |
| 2010/0212930 A1 | 8/2010 | Yasumoto et al. | |
| 2013/0202524 A1 | 8/2013 | Maurer et al. | |
| 2014/0220343 A1 | 8/2014 | Choi et al. | |
| 2016/0268018 A1 | 9/2016 | Sica et al. | |

FOREIGN PATENT DOCUMENTS

| | | |
|---|---|---|
| WO | WO 98/52197 | 11/1998 |
| WO | WO 2015/059520 A1 | 4/2015 |

OTHER PUBLICATIONS

McCusker, L. B. et al., "Nomenclature of Structural and Compositional Characteristics of Ordered Microporous and Mesoporous Materials with Inorganic Hosts", IUPAC Recommendations 2001, Pure Appl. Chem., vol. 73, No. 2, pp. 381-394, 2001.

* cited by examiner

METHOD FOR EXTRACTING CROSSLINKING BY-PRODUCTS FROM A CROSSLINKED ELECTRICALLY INSULATING SYSTEM OF A POWER CABLE AND RELATED POWER CABLE

BACKGROUND OF THE DISCLOSURE

The present disclosure relates to a method for extracting crosslinking by-products from a crosslinked electrically insulating system of a power cable and a related power cable.

Cables for transporting electric energy, particularly in the case of cables for medium or high voltage applications, generally include a cable core. The cable core is usually formed by at least one conductor coated with an insulating system sequentially formed by an inner polymeric layer having semiconducting properties, an intermediate polymeric layer having electrically insulating properties, and an outer polymeric layer having semiconducting properties. Cables for transporting medium or high voltage electric energy generally include a screen layer, typically made of metal or of metal and polymeric material, surrounding each cable core or all of them together. The screen layer can be made in form of wires (braids), of a tape helically wound around the cable core or a sheet longitudinally wrapped around the cable core.

The polymeric layers of the insulating system are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during conventional use and with current overload.

The crosslinking process of polyolefin materials, particularly polyethylene, requires the addition to the polymeric material of a crosslinking agent (crosslinker), usually an organic peroxide compound, and subsequent heating at a temperature to cause peroxide cleavage and reaction. By-products are formed, mainly deriving from the decomposition of the organic peroxide. In the presence of a continuous electrical field, such by-products, being entrapped within the crosslinked material, cause an accumulation of space charges which may cause electrical discharges and eventually insulation piercing, particularly in direct current (DC) energy cables. For instance, dicumyl peroxide, the most common crosslinking agent used for cable insulation, forms light by-product (methane) and heavy by-products, mainly acetophenone and cumyl alcohol. Methane can be eliminated from the cable core with a short degassing process at a relatively low temperature (about 70° C.), while acetophenone and cumyl alcohol can be removed only by subjecting the cable core to a prolonged degassing process, at a temperature suitable to cause migration of the by-products (usually about 70° C.÷80° C.) and subsequent evaporation from the cable core. This degassing process should be performed for a long time (usually from 15 days to about 2 months, depending on the cable dimensions) and cannot be carried out continuously but only batch-wise in large degassing devices which can host a given cable length. This increases to a large extent the production time and costs of DC energy cables.

It is known to incorporate particles of zeolites into power cables having an insulating system made of a crosslinked polymer material in order to reduce the duration of the degassing process.

WO 2015/059520 by this Applicant discloses an energy cable comprising a cable core with a crosslinked electrically insulating system, and zeolite particles placed in the cable core. The zeolite has a $SiO_2/Al_2O_3$ molar ratio equal to or lower than 20, a maximum diameter of a sphere that can diffuse along at least one of the cell axes directions equal to or higher than 3 Å, a dimensionality of 2, and a sodium content, expressed as $Na_2O$ equal to or lower than 0.3 wt %.

GB 12513991 relates to a method of waterproofing dynamic cables particularly for sub-aquatic, high voltage transmission applications. The cable has an inner portion and an outer portion, the outer portion comprising a layer of hygroscopic material surrounding the inner portion and a layer of low diffusion material surrounding the layer of hygroscopic material. The layer of hygroscopic material which comprises a desiccant, e.g. a zeolite, contained in a polymer material. The layer of hygroscopic material absorbs water that permeates into the cable through the low diffusion polymer layer. The concentration of the desiccant in the polymer is preferably chosen to be as high as practical, for example 30% or higher. The size of the zeolite particles is preferably less than 10 μm. The mean porosity of the zeolite particles is preferably between 2.5 and 3.5 Angstroms and more preferably at or around 3 Angstroms.

U.S. Pat. No. 6,005,192 relates to a jacket material containing additives, i.e. an ion exchange resin and/or an ionic scavenging compound, that remove or inhibit the passage of ionic impurities into the insulation of the cable. These additives may include zeolites. The amount of additives required is typically in the range of 5 to 20 percent by total weight with the jacket material.

The Applicant has now unexpectedly observed that the degassing process of power cables containing zeolites in the cable core as described in WO 2015/059520 results indeed in an efficient and irreversible absorption of the crosslinking by-products, but it is also accompanied by a substantial increase of the moisture content in the cable insulating system.

Without wishing to be bound by theory, the increase of the moisture content is likely due to the oligomerization and decomposition reactions of the crosslinking by-products during or after the absorption into the zeolite particles, which is accompanied by the in situ-formation of water molecules. A catalytic role of the zeolite in these reactions has been conjectured, too.

The presence of moisture in the insulating system material, even in relatively low amounts (about 100 ppm of water), may jeopardize the insulation properties of the cable giving raise, for instance, to the formation of water-trees that considerably weaken the dielectric properties of the insulating system material.

SUMMARY OF THE DISCLOSURE

The Applicant has faced the problem of overcoming or ameliorate some of the problems set out above. Particularly, a scope of the present disclosure is to eliminate the high temperature, long lasting degassing process of the power cable cores having a crosslinked insulating system, or at least to reduce temperature and/or duration of the same, so as to increase productivity and reduce manufacturing costs, by providing zeolite particles in the cable core capable of effectively absorbing the crosslinking by-products, and also preventing the accumulation in the insulating system of water produced by this by-products absorption process.

The above problem and others that will appear more clearly from the following disclosure can be solved by providing a cable core that include particles of a zeolite system comprising two different types of zeolites, a first zeolite being specifically suitable for entrapping the crosslinking by-products and a second zeolite being specifically suitable for entrapping the water molecules that form through the oligomerization and decomposition reactions of the crosslinking by-products. The particles of the zeolite system are placed in the cable core near the insulating layer, but not in direct contact thereto for not affecting its performance in the insulating system. As it will be better explained in the following, the zeolite system can be provided, for instance, within the wires of the cable conductor and/or between a semiconducting layer and the cable conductor or the metal screen. Indeed, by using two types of zeolite particles it is possible to extract and absorb, very efficiently and irreversibly, the by-products deriving from the crosslinking reaction, so as to avoid space charge accumulation in the insulating material during cable lifespan and, at the same time, to absorb efficiently and irreversibly the water molecules produced by such absorption so that their migration into the insulation system material and the formation of water-trees is also avoided or at least reduced.

Therefore, according to a first aspect, the present disclosure relates to a power cable comprising at least one cable core comprising:
an electric conductor surrounded by a crosslinked insulating system made of at least one polyolefin crosslinked by reaction with at least one peroxide crosslinker and comprising:
  an inner semiconducting layer surrounding the electric conductor;
  an electrically insulating layer surrounding the inner semiconducting layer; and
  an outer semiconducting layer surrounding the electrically insulating layer;
wherein a zeolite system comprising particles of a first zeolite and particles of a second zeolite is placed in the cable core,
the first zeolite having a $SiO_2/Al_2O_3$ ratio higher than 5 and equal to or lower than 20, and a maximum diameter of a sphere than can diffuse along at least one of the cell axes directions higher than 5 Å; and
the second zeolite having a $SiO_2/Al_2O_3$ ratio of 5 at most, and a maximum diameter of a sphere than can diffuse along at least one of the cell axes directions of from 3 Å to 5 Å.

According to a second aspect, the present disclosure relates to a method for extracting crosslinking by-products from a crosslinked electrically insulating system of a power cable core, said method comprising the following sequential stages:
(a) manufacturing a power cable core comprising:
  an electric conductor;
  an electrically insulating system surrounding the electric conductor and made of at least one polyolefin crosslinked by reaction with at least one peroxide crosslinker thereby containing cross-linking by-products; and
  a zeolite system comprising particles of a first zeolite and particles of a second zeolite placed in the cable core, the first zeolite having a $SiO_2/Al_2O_3$ ratio higher than 5 and equal to or lower than 20, and a maximum diameter of a sphere than can diffuse along at least one of the cell axes directions higher than 5 Å; and the second zeolite having a $SiO_2/Al_2O_3$ ratio of 5 at most, and a maximum diameter of a sphere than can diffuse along at least one of the cell axes directions of from 3 Å to 5 Å;
(b) heating the power cable core up to a temperature causing migration of the crosslinking by-products and water molecules from the crosslinked electrically insulating system to the zeolite system, thereby the crosslinking by-products are absorbed by the particles of the first zeolite and the water molecules are absorbed by the particles of the second zeolite;
(c) placing a metal screen around the power cable core.

The heating step of the above method causes at least one fraction of the crosslinking by-products to be substantially irreversibly absorbed into the particles of the first zeolite of the zeolite system, while another fraction can diffuse outside the cable core.

In particular, the first zeolite of the zeolite system has structural characteristics (e.g. pore size and architecture) that makes it particularly suitable for absorbing the crosslinking by-products, such as acetophenone and cumyl alcohol. During the heating step, the water molecules that are conjectured to generate from the dimerization/oligomerization or decomposition reactions of the crosslinking by-products taking place on the surface of the channels of the first zeolite, may escape from the first zeolite because of their small size compared to the size of the channel apertures. Once escaped, the water molecules can be captured by the particles of the second zeolite, which has selected structural properties so as to irreversibly absorb water molecules.

During the heating step, a fraction of crosslinking by-products which is gaseous at ambient temperature, such as methane, or which has a low boiling point, is eliminated by causing it to diffuse out of the cable core. For example, the heating step is carried out at a temperature of from 70° C. to 80° C., for a time of from 7 to 15 days. The presence of particles of the zeolite system according to the present description in the cable core avoids to perform a degassing procedure according to the customary times (usually from 15 to 30 days, as said above) for removing high-boiling by-products, such as cumyl alcohol and acetophenone, while maintaining the moisture content of the insulation system material within acceptable levels by entrapping the in situ formed water molecules.

For the purpose of the present disclosure and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the disclosure.

The present disclosure, in at least one of the aforementioned aspects, can be implemented according to one or more of the following embodiments, optionally combined together.

For the purposes of the present disclosure the term "medium voltage" generally means a voltage of between 1 kV and 35 kV, whereas "high voltage" means voltages higher than 35 kV.

As "electrically insulating layer" it is meant a covering layer made of a material having insulating properties, namely having a dielectric rigidity (dielectric breakdown strength) of at least 5 kV/mm, for example of at least 10 kV/mm.

As "crosslinked electrically insulating system" it is meant an insulating system comprising: an inner semiconducting layer surrounding an electric conductor; an electrically insulating layer surrounding and in direct contact with the inner semiconducting layer; and an outer semiconducting layer surrounding and in direct contact with the electrically insulating layer. All of the layers of the electrically insulating system are made of a crosslinked polyolefin.

For the purpose of the present disclosure and of the claims that follow, as "irreversible absorption of by-products" and the like it is meant that once absorbed by the zeolite particles no substantial release of by-products is observed.

For the purpose of the present disclosure and of the claims that follow, as "irreversible absorption of water molecules" and the like it is meant that once absorbed by the zeolite particles no substantial release of water molecules is observed.

As "core" or "cable core" it is meant the cable portion comprising an electrical conductor and an insulating system.

For the purpose of the present disclosure and of the claims that follow, the term "in the cable core" means any position inside or in direct contact with at least one of the cable core components but not in contact with the insulating layer.

For the purpose of the present disclosure and of the claims that follow, the term "particles of the zeolite system" include particles of both the first zeolite and the second zeolite, unless otherwise explicitly stated.

According to an embodiment, the electric conductor is formed by a plurality of stranded electrically conducting wires defining a bundle of wires. The particles of the zeolite system can be placed within voids among said wires.

The power cable of the present disclosure can have one, two or three cable cores.

According to an embodiment, the particles of the zeolite system can be placed in contact with a semiconducting layer. The semiconducting layer can be the inner semiconducting layer surrounding the conductor and located in a radially internal position with respect to the electrically insulating layer. For example, the particles of the zeolite system are placed between the outer perimeter of the conductor wires bundle and the inner semiconducting layer.

According to another embodiment, the particles of the zeolite system are placed into the semiconducting layer, for example they are incorporated in the polymeric matrix of the polymer material forming the semiconducting layer. Such semiconducting layer can be the inner semiconducting layer disposed over the electric conductor.

According to another embodiment, the particles of the zeolite system are placed both within voids among the wires of the electric conductor, and into or in contact with a semiconducting layer, for example the inner semiconducting layer or the outer semiconducting layer. If the particles of the zeolite system are:

within voids among the wires of the electric conductor, and into or in contact with a semiconducting layer, or into or in contact with the inner semiconducting layer and into or in contact with the outer semiconducting layer;

the effect of the zeolite system can be exerted on both sides of the electrically insulating layer, and therefore the extraction and absorption of the crosslinking by-products and water can be more efficient.

In an embodiment, the particles of the zeolite system can be dispersed in or on a material placed into the cable core.

According to an embodiment, the particles of the zeolite system are dispersed in a filling material. The filling material can be a polymeric filling material which can be provided in the cable core by a continuous deposition process, especially by extrusion or by pultrusion. The filling material can be a buffering filling material, which is usually placed among the wires forming the electric conductor of a power cable in order to avoid water or moisture propagation possibly penetrating into the cable conductor from the outside, especially when the cable is to be installed in very humid environments or under water. The buffering filling material generally comprises a polymeric material and a hygroscopic material, for example a compound based on an ethylene copolymer, for example an ethylene/vinyl acetate copolymer, filled with a water absorbing powder, for example sodium polyacrylate powder.

According to another embodiment, the particles of the zeolite system are dispersed on the surface of a yarn or tape, which can be hygroscopic. Hygroscopic yarns are generally known in power cables to be placed in contact with the conductor wires and/or with the outer semiconducting layer so as to provide water-blocking properties. The hygroscopic yarns are generally made from polymeric filaments, e.g. polyester filaments, on which particles of a hygroscopic material, for instance polyacrylate salts, are deposited by means of an adhesive material, typically polyvinyl alcohol (PVA). Such yarns can be modified according to the present disclosure by depositing on the polymer filaments a mixture of hygroscopic particles and particles of the zeolite system. For example, the polymer filaments can be moistened with a solution of the adhesive material, and then the particles of the zeolite system are sprinkled thereon and remain entrapped in the solution and, after drying, in the adhesive material.

A similar technique can be used to provide hygroscopic tapes including particles of the zeolite system. The hygroscopic tapes commonly used in energy cables can be non-conductive and placed, for example, onto the cable screen, or they can be semiconducting, for example when placed between the conductor and the inner semiconducting layer. On the hygroscopic tapes, usually made from a non-woven fabric of polymer filaments, particles of a hygroscopic material, for instance polyacrylate salts, are deposited by means of an adhesive material, as mentioned above. Such tapes can be modified according to the present disclosure by depositing a mixture of hygroscopic particles and the particles of the zeolite system on the non-woven fabric.

According to an embodiment, a tape containing the particles of the zeolite system is wound onto an outer semiconducting layer disposed over the electrically insulating layer. Subsequently, the cable core, devoid of the metal screen, is heated to a temperature so as to cause migration of the crosslinking by-products from the crosslinked electrically insulating layer to the particles of the zeolite system, thereby the particles of the first zeolite absorb the crosslinking by-products; because of the heating, the water molecules conceivably generated by the dimerization/oligomerization or decomposition of the by-products occurring on the channel surface of the first zeolite or originally present in the crosslinked insulation layer are caused to migrate and are entrapped (irreversibly absorbed) by the second zeolite particles. At the end of the methane degassing process, a metal screen is placed around the energy cable core according to well-known techniques.

According to the above embodiments, it is apparent that the particles of the zeolite system can be placed in the crosslinked electrically insulating system by means of cable elements that are usual components of power cables, such as hygroscopic yarns or tapes or buffering filling materials, thus avoiding supplementing the cable with an additional component which would not be necessary for a conventional cable. This reduces cable manufacturing costs and time. The above does not exclude the possibility of providing the power cable with particles of the zeolite system by means of one or more additional components purposively placed into the cable to obtain extraction and absorption of the crosslinking by-products and the in situ formed water molecules.

As regards the zeolite particles suitable for the system of the present disclosure, they can be selected from a wide range of aluminosilicates of natural or synthetic origin, having a microporous structure that can accommodate a variety of cations, such as $Na^+$, $K^+$, $Ca^{2+}$, $Mg^{2+}$ and others. They act as molecular sieves due to their ability to selectively sort molecules mainly on the basis of a size exclusion process.

Without wishing to be bound to any theory, the Applicant conjectures that zeolite particles of the first type above are particularly effective as irreversible absorbers for the crosslinking by-products, such as acetophenone and cumyl alcohol, since these molecules, when entered within the first zeolite microporous structure, seem to undertake oligomerization reactions (specifically, dimerization reaction) converting them into much more bulky molecules. As a result, the now bulky crosslinking by-products become irreversibly trapped within the first zeolite structure and cannot migrate back outside, even after prolonged exposure to relatively high temperatures, such as those reached by the power cable during use. Even in the absence of oligomerization reactions, the by-products mainly remain into the zeolite particles because their solubility into the crosslinked polymer is lower than that into the zeolite particles.

The zeolite system according to the present disclosure comprises a first type of zeolite (first zeolite particles) having a $SiO_2/Al_2O_3$ ratio higher than 5 and of 20 at most.

In an embodiment, the first zeolite has a $SiO_2/Al_2O_3$ molar ratio of 15 at most.

The first zeolite has a maximum diameter of a sphere that can diffuse along at least one (for example, along all the three) of the cell axes directions (hereinafter also referred to as "sphere diameter" of the zeolite) of at least 5 Å, for example of at least 5.2 Å. As well known in the zeolite field, this sphere diameter provides quantitative information about the size of the channels present in the zeolite structure, which can develop in one dimension, two dimensions or three dimensions (the so called "dimensionality" which can be 1, 2 or 3). In an embodiment, the first zeolite of the present disclosure has a dimensionality of 2 or of 3.

In an embodiment, the first zeolite has an alkaline or alkaline earth-metal cation (charge compensating cation such as $Na^+$, $K^+$, $Ca^{2+}$ or $Mg^{2+}$) content expressed as oxide, of 0.3 wt % at most based on the weight of the first zeolite. For example, the oxide of alkaline or alkaline earth-metal cation is sodium oxide $Na_2O$.

The first zeolite having a $SiO_2/Al_2O_3$ molar ratio, sphere diameter and sodium content in the ranges according to the present disclosure are capable to absorb an amount of high boiling crosslinking by-products in a given time higher than other zeolite having at least one of the mentioned feature out of the range according to the present disclosure.

Without wishing to be bound to any theory, the Applicant believes that second zeolite particles above are effective as irreversible absorbers of the water molecules that can form in situ as a result of, conceivably, the dimerization and/or oligomerization reactions of the crosslinking by-products (e.g. cumyl alcohol). The water molecules have a smaller size than the molecules of crosslinking by products and can freely escape from the first zeolite where they would form, being however irreversibly trapped within the structure of the second zeolite with no possibility of migrating back outside.

The zeolite system according to the present disclosure comprises a second type of zeolite (second zeolite particles), different from the first type one, having a $SiO_2/Al_2O_3$ ratio of 5 at most.

In an embodiment, the second zeolite has a $SiO_2/Al_2O_3$ molar ratio of from 1.5 to 4.5.

In an embodiment, the second zeolite has a maximum diameter of a sphere than can diffuse along at least one of the cell axes directions (hereinafter also referred to as "sphere diameter" of the zeolite) of from 3 Å to 5 Å. For example, the second zeolite has a maximum diameter of a sphere that can diffuse along at least one (for example along all the three) of the cell axes directions of from 3.2 Å to 4.8 Å. Preferably, the second zeolite of the present disclosure has a dimensionality of 2 or of 3.

In an embodiment, the second zeolite has an alkaline or alkaline earth-metal cation (charge compensating cation such as $Na^+$, $K^+$, $Ca^{2+}$ or $Mg^{2+}$) content expressed as oxide, of at least 2 wt % based on the weight of the second zeolite. For example, the oxide of alkaline or alkaline earth-metal cation is sodium oxide $Na_2O$.

The second zeolite having a $SiO_2/Al_2O_3$ molar ratio, sphere diameter and sodium content in the ranges according to the present disclosure are capable to absorb an amount of water in a given time higher than other zeolite particles having at least one of the mentioned feature out of the range according to the present disclosure.

More details about zeolite nomenclature and parameters can be found, e.g., in IUPAC Recommendations 2001, *Pure Appl. Chem.*, Vol. 73, No. 2, pp. 381-394, 2001, or in the website of the International Zeolite Association (IZA) (http://www.iza-structure.org/).

As regards the relative amount of first zeolite particles and second zeolite particles in the zeolite system, this can be selected within a wide range of values. In an embodiment, the second zeolite particles are present in an amount of from 1 wt % to 50 wt %, for example in an amount of from 5 wt % to 20 wt %, based on the total weight of the zeolite system.

The zeolite system can be prepared in any suitable way, for example by mixing particles of the first and second zeolite together.

As regards the amount of particles of the zeolite system to be placed in the vicinity of the crosslinked electrically insulating layer, it can vary within a wide range and mainly depends on the type of zeolite, the amount of by-products and water to be eliminated, the thickness of the insulating layer, the degassing temperature, and the final target by-products and water contents.

In an embodiment, assuming a final target of 0.32 wt % of by-products (cumyl alcohol, acetophenone, alfa methylstyrene) content, the overall amount of zeolite particles placed in the core (e.g. between the electric conductor and the inner semiconducting layer) of the cable of the disclosure is at most of 0.008 g/cm³ with respect to the volume of the cross-linked insulating system. For example, the overall amount of zeolite particles in the cable core of this disclosure is of at least 0.003 g/cm³ or of at least 0.004 g/cm³ with respect to the volume of the crosslinked insulating system. In view of such ranges and indications, the skilled person is able to determine a suitable amount of zeolite particles to be placed into a given insulation system without undue burden.

As regards the electrically insulating layer, it can comprise at least one polyolefin, for example at least one ethylene homopolymer or copolymer of ethylene with at least one alpha-olefin $C_3$-$C_{12}$, having a density from 0.910 g/cm³ to 0.970 g/cm³, for example from 0.915 g/cm³ to 0.940 g/cm³.

The ethylene homopolymer or copolymer can have a melting temperature ($T_m$) higher than 100° C. and/or a melting enthalpy ($\Delta H_m$) higher than 50 J/g.

The ethylene homopolymer or copolymer can be selected from: medium density polyethylene (MDPE) having a density from 0.926 g/cm³ to 0.970 g/cm³; low density polyethylene (LDPE) and linear low density polyethylene (LLDPE) having a density from 0.910 g/cm³ to 0.926 g/cm³; high density polyethylene (HDPE) having a density from 0.940 g/cm³ to 0.970 g/cm³. In an embodiment of the present disclosure the crosslinked electrically insulating layer comprises LDPE.

The polyolefin forming the electrically insulating layer is crosslinked by reaction with at least one organic peroxide crosslinker. In an embodiment, the organic peroxide crosslinker has formula $R_1$—O—O—$R_2$, wherein $R_1$ and $R_2$, equal or different from each other, are linear or branched alkyls $C_1$-$C_{18}$, aryls $C_6$-$C_{12}$, alkylaryls or arylalkyls $C_7$-$C_{24}$. In an embodiment, the organic peroxide is selected from: dicumyl peroxide, t-butyl cumyl peroxide, 2,5-dimethyl-2,5-di(t-butyl peroxy)hexane, di-t-butyl peroxide, or mixtures thereof.

In an embodiment, the organic peroxide crosslinker is added to the polyolefin in an amount of from 0.05 wt % to 8 wt %, for example from 0.1 wt % to 5 wt %, based on the weight of the polyolefin.

The electrically insulating layer may further comprise an effective amount of one or more additives, selected e.g. from: antioxidants, heat stabilizers, processing aids, anti-scorching agents, inorganic fillers.

As regards a semiconducting layer, it is formed, for example, by the same polymeric material used for the electrically insulating layer (and similarly crosslinked), and a conductive filler, such as a carbon black filler. The conductive filler is generally dispersed within the polymeric material in a quantity such as to impart semiconducting properties to the material, namely to obtain a volumetric resistivity value, at room temperature, of less than 500Ω·m, for example less than 20Ω·m. Typically, the amount of carbon black can range between 1 and 50 wt %, or between 3 and 30 wt %, relative to the weight of the polymer.

The production of the power cable according to the present disclosure can be carried out according to known techniques, particularly by extrusion of the electrically insulating system over the electric conductor.

BRIEF DESCRIPTION OF THE DRAWING

Further characteristics will be apparent from the detailed description given hereinafter with reference to the accompanying drawings, in which.

DETAILED DESCRIPTION OF SOME EMBODIMENTS

Figure 1:
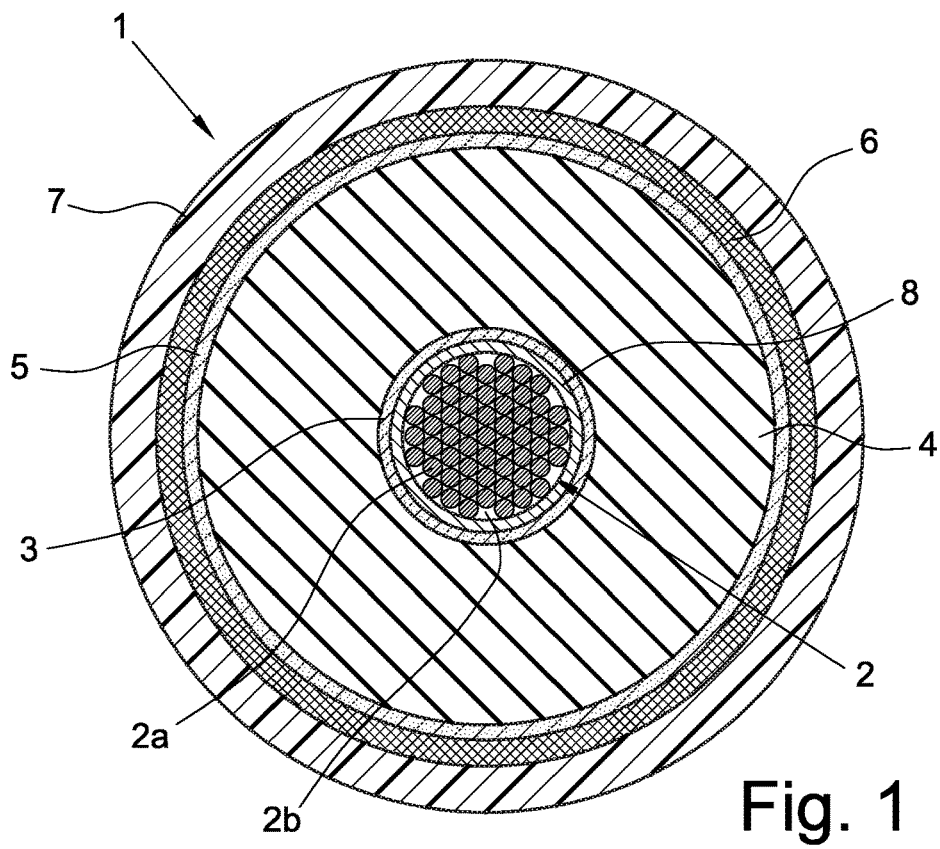
FIG. 1 is a transversal cross section of a first embodiment of a power cable, particularly suitable for medium or high voltage, according to the present disclosure.

In FIG. 1, a transversal section of a cable (1) according to the present disclosure is schematically represented. Cable (1) comprises an electric conductor (2), an inner semiconducting layer (3), an electrically insulating layer (4), an outer semiconducting layer (5), a metal screen (6) and a sheath (7). Electric conductor (2), inner semiconducting layer (3), electrically insulating layer (4) and the outer semiconducting layer (5) constitute the core of cable (1). Cable (1) is particularly intended for the transport of medium or high voltage current.

The conductor (2) consists of metal wires (2a), for example of copper or aluminium or both, stranded together by conventional methods. The electrically insulating layer (4) and the semiconducting layers (3) and (5) are made by extruding and cross-linking polymeric materials according to known techniques. Around the outer semiconducting layer (5), a metal screen layer (6) is positioned, made of electrically conducting wires or strips, for example helically wound around the cable core, or of an electrically conducting tape longitudinally wrapped and overlapped (and, optionally, glued) onto the underlying layer. The electrically conducting material of said wires, strips or tape is usually copper or aluminium or both. The screen layer (6) may be covered by a sheath (7), generally made from a polyolefin, usually polyethylene, in particular high density polyethylene.

Figure 2:
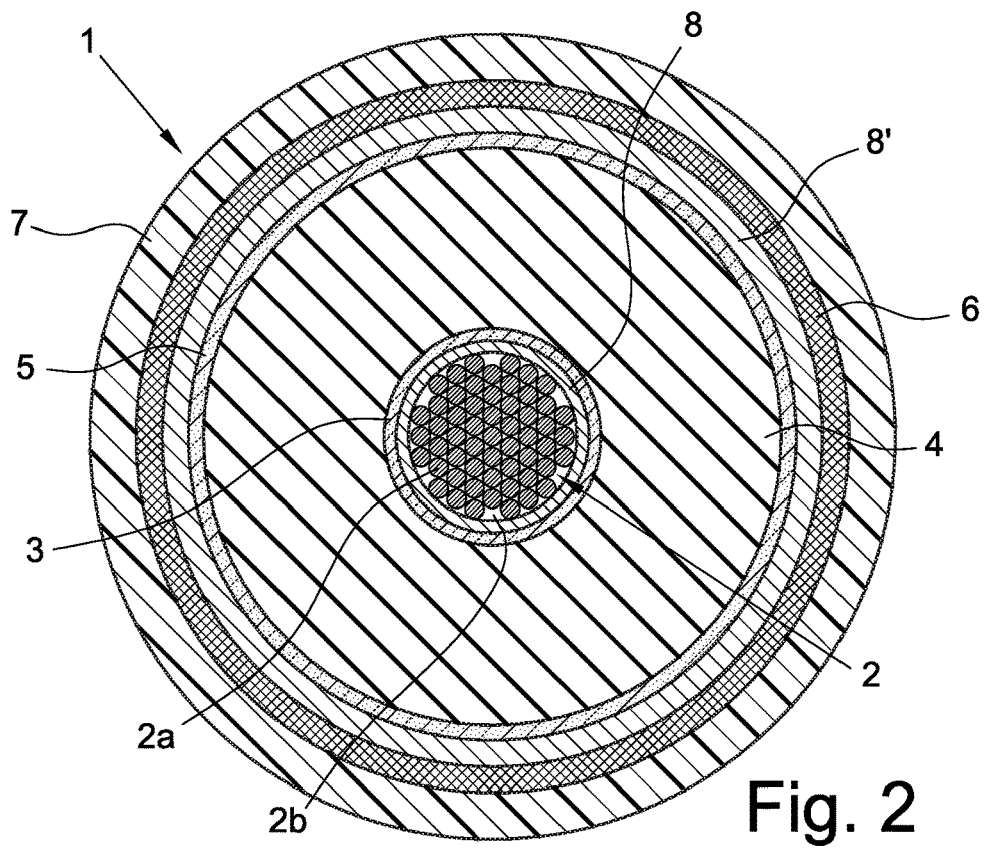
FIG. 2 is a transversal cross section of a second embodiment of a power cable, particularly suitable for medium or high voltage, according to the present disclosure.

In accordance with an embodiment of the present description, a tape (8) with particles of the zeolite system according to the present disclosure dispersed upon, is wound between the conductor (2) and the inner semiconducting layer (3). In FIG. 2, a transversal section of another cable (1) according to the present description is schematically represented. This cable (1) comprises the same elements as described in FIG. 1, with the addition of further particles of a zeolite system according to the present disclosure dispersed in a filling material (2b), for example a buffering filling material, placed within voids among the wires (2a) of the electric conductor (2) or between the outer perimeter of the electric conductor (2) and the tape (8). This filling material can also have the function of avoiding the propagation of water or humidity possibly penetrated within the cable conductor (2), especially when the cable (1) is to be installed in very humid environments or under water.

Also, the cable (1) of FIG. 2 has a tape (8'), similar to the tape (8), wound between the outer semiconducting layer (5) and the metal screen (6), the tape (8') bearing particles of the zeolite system of the present disclosure.

FIGS. 1 and 2 show only two embodiments of the present disclosure. Suitable modifications can be made to these embodiments according to specific technical needs and application requirements without departing from the scope of this disclosure. For example, a cable according to the present disclosure can comprise particles of the zeolite system herein taught in one, two or all of the following positions: (i) between the electric conductor and the inner semiconducting layer, (ii) among the electric conductor wires, and (iii) between the outer semiconducting layer and the metal screen.

The following examples are provided to further illustrate the subject matter of the present description.

Example 1

Some tests were carried out to evaluate the ability of tapes bearing a zeolite system comprising particles of a first zeolite (suitable for absorbing crosslinking by-products deriving from crosslinking reaction of polyethylene with cumyl peroxide, particularly cumyl alcohol), and particles of a second zeolite (suitable for trapping water molecules).

The tape carried particles of a zeolite system comprising:
  zeolite CBV 600 (Y-type zeolite having: charge compensating cation=$H^+$; specific surface area=660 $m^2/g$; $SiO_2/Al_2O_3$ ratio=5.2; $Na_2O$ %=0.2; dimensionality=3; maximum diffusing sphere diameter=7.35 Å) to absorb the crosslinking by-products
  zeolite A3 (A-type zeolite [$(Na^+_{12}(H_2O)_{27})_8$ $[Al_{12}Si_{12}O_{48}]_8$ having: charge compensating cation=$Na^+$; specific surface area=800 $m^2/g$; $SiO_2/Al_2O_3$ ratio=1; $Na_2O$ %=13 wt %; dimensionality=X; maximum diffusing sphere diameter=4.2 Å) to absorb water.

The weight ratio between the CBV 600 first zeolite and the A3 second zeolite was about 90:10.

In a first cable (SAMPLE A) according to the present disclosure, the tape was placed between the conductor and the inner semiconducting layer. The conductor had a cross-section of 2,500 $mm^2$, the inner semiconducting layer had an inner diameter of about 64 mm and the outer semiconducting layer had an outer diameter of about 107 mm. The conductor was made of a multiplicity of copper wires, the tape being placed around the bundle of wires and in contact with its outer perimeter. The voids among the wires were filled with a buffer material made of 92 AC JV (a mixture based on EPDM and EVA, marketed by Sigea S.p.A.). The insulation layer, which was made of XLPE like the semiconducting layers, had a thickness of 20 mm.

The amount of particles of the zeolite system that were placed between the conductor and the inner semiconducting layer was about 0.0054 $g/cm^3$.

For comparison purposes, a power cable having the same structure of Sample A described above, but without any the addition of zeolite particles, was also prepared and tested (SAMPLE C).

The concentrations of cross-linking by-products were measured by column gas chromatography of samples of cross-linked insulating material as a whole slice (S) or cut at different positions of the insulating layer ("close to outer semiconducting layer" (VSE), "central part" (C), "close to the inner semiconducting layer" (VSI)).

The samples were cut into small pieces and extracted by speed extractor at the following operating conditions:
  Solvent: Acetone
  Volume: 100 ml
  Temperature: 90° C.
  Pressure: 100 bars
  Extraction time: 5 hours
  Sample weight: 5 g To determine the content of by-products in the tapes with zeolites, a sample of each tape was extracted by means of a soxhlet extractor at the following operating conditions:
  Solvent: ethyl ether
  Volume: 100 ml
  Extraction time: 24 hours
  Sample weight: 5 g The analyses were carried out on the cables after degassing at 70° C. for a time up to 49 days, unless otherwise stated. The results are reported in Tables 1 to 2, where the by-products content at each position are listed and compared to the corresponding ones of the sample before degassing (fresh).

TABLE 1

Sample A

| | | Acetophenone wt % | Cumyl alcohol wt % | TOTAL % |
|---|---|---|---|---|
| Fresh | S | 0.30 | 0.62 | 0.94 |
| | VSE | 0.21 | 0.32 | 0.59 |
| | C | 0.45 | 0.81 | 1.28 |
| | VSI | 0.38 | 0.84 | 1.23 |
| Degassed 28 days | S | 0.13 | 0.29 | 0.48 |
| | VSE | 0.11 | 0.25 | 0.39 |
| | C | 0.20 | 0.44 | 0.71 |
| | VSI | 0.22 | 0.30 | 0.67 |
| Degassed 49 days | S | 0.10 | 0.19 | 0.38 |
| | VSE | 0.07 | 0.15 | 0.26 |
| | C | 0.13 | 0.25 | 0.47 |
| | VSI | 0.17 | 0.17 | 0.54 |

From the data reported in the Table 1, it is apparent that the zeolite system contained in Sample A according to the present disclosure is able to reduce the cross-linking by-products concentration in the insulating material and, in particular, the cumyl alcohol concentration in substantially shorter time compared to the known degassing procedure without incorporating any zeolite in the cable. Notably, the presence of the zeolite system allows to reduce the total amount of by-products below 0.5 wt % after 28 days of degassing (Sample A, Slice).

TABLE 2

Sample C

| | | Acetophenone wt % | Cumyl alcohol wt % | TOTAL % |
|---|---|---|---|---|
| Fresh | S | 0.30 | 0.61 | 0.93 |
| | VSE | 0.21 | 0.33 | 0.59 |
| | C | 0.42 | 0.77 | 1.21 |
| | VSI | 0.30 | 0.72 | 1.02 |
| Degassed 35 days | S | 0.15 | 0.39 | 0.57 |
| | VSE | 0.11 | 0.27 | 0.40 |
| | C | 0.22 | 0.54 | 0.79 |
| | VSI | 0.21 | 0.40 | 0.63 |
| Degassed 49 days | S | 0.12 | 0.32 | 0.45 |
| | VSE | 0.07 | 0.21 | 0.29 |
| | C | 0.16 | 0.42 | 0.59 |
| | VSI | 0.19 | 0.39 | 0.60 |

In the same cable as Sample A without any zeolite, a concentration below 0.5 wt % of by-products in the insulation is obtained not earlier than a five-to-seven-week degassing (Sample C, Slice).

Example 2

To determine the moisture content of the insulating layer, the Samples A and C were analyzed by a Karl Fischer titrator at the following conditions:
  Oven temperature: 130° C.
  Environmental humidity<5%
  Sample weight: 200 mg
  Analysis repetition: 5

The results of the water content analysis at different insulation positions are reported in Table 3.

TABLE 3

| Water content in the insulating material | |
|---|---|
| Sample A | $H_2O$ (ppm) |
| S | 51.7 |
| VSE | 49.0 |
| C | 53.2 |
| VSI | 48.4 |

As it can be inferred from Table 3, both the zeolite system of Sample A according to the present disclosure was able to keep the moisture content into the insulation layer to a value significantly lower than 100 ppm.

In similar experiments carried out on an 525 kV DC cable containing first zeolite particles (CBV 600) only, placed within the voids of the conducting wires as well as distributed on tapes between the conductor outer perimeter and the inner semiconducting layer, and on tapes surrounding outer semiconducting layers, the water content in the insulation layer center was found to be higher than 350 ppm after degassing for 42 days at 70° C. The highest concentration of water (nearly 400 ppm) was found close to the inner semiconducting layer, i.e. in the region of the cable containing the highest portion of first zeolite particles (on the tape between the inner semiconducting layer and the conductor and in the conductor body). Such a high amount of water observed in this experiment cannot be due to a water present in the freshly extruded insulating system and it is conjectured to be generated by the dimerization/oligomerization or decomposition reaction of the crosslinking by-products upon their absorption on the particles of the first zeolite.

The invention claimed is:

1. A power cable comprising at least one cable core comprising an electric conductor surrounded by a crosslinked insulating system made of at least one polyolefin crosslinked by reaction with at least one peroxide crosslinker and comprising:
   an inner semiconducting layer surrounding the electric conductor;
   an electrically insulating layer surrounding the inner semiconducting layer;
   an outer semiconducting layer surrounding the electrically insulating layer;
   wherein a zeolite system comprising particles of a first zeolite and particles of a second zeolite is placed in the cable core,
   the first zeolite having a $SiO_2/Al_2O_3$ ratio higher than 5 and equal to or lower than 20, and a maximum diameter of a sphere than can diffuse along at least one of the cell axes directions higher than 5 Å; and
   the second zeolite having a $SiO_2/Al_2O_3$ ratio equal of 5 at most, and a maximum diameter of a sphere than can diffuse along at least one of the cell axes directions of from 3 Å to 5 Å.

2. The power cable according to claim 1, wherein the conductor comprises a plurality of stranded electrically conducting wires defining a bundle of wires and the particles of the zeolite system are placed between the outer perimeter of the bundle of wires and the inner semiconducting layer.

3. The power cable according to claim 1, wherein the electric conductor is formed by a plurality of stranded electrically conducting wires defining a bundle of wires and the particles of the zeolite system are placed within voids among said wires.

4. The power cable according to claim 1, wherein the particles of the zeolite system are placed in contact with the inner surface of the inner semiconducting layer.

5. The power cable according to claim 1, wherein the particles of the zeolite system are in the inner semiconducting layer.

6. The power cable according to claim 3, wherein the particles of the zeolite system are dispersed in/on a substrate.

7. The power cable according to claim 1, wherein the total amount of particles of the zeolite system is of 0.008 $g/cm^3$ at most.

8. The power cable according to claim 1, wherein the total amount of particles of the zeolite system is of at least 0.003 $g/cm^3$.

9. The power cable according to claim 1, wherein the first zeolite has a charge compensating cation content, expressed as oxide, of at most 0.3 wt % based on the weight of the first zeolite.

10. The power cable according to claim 1, wherein the second zeolite has a charge compensating cation content, expressed as oxide, of at least 10 wt % based on the weight of the second zeolite.

11. The power cable according to claim 1, wherein the second zeolite is present in an amount of from 1 wt % to 50 wt % based on the weight of the zeolite system.

12. A method for extracting crosslinking by-products from a crosslinked electrically insulating system of a power cable core, said method comprising the following sequential stages:
   (a) manufacturing a power cable core comprising:
      an electric conductor,
      an inner semiconducting layer surrounding the electric conductor;
      an electrically insulating system surrounding the electric conductor and made of at least one polyolefin crosslinked by reaction with at least one peroxide crosslinker thereby containing cross-linking by-products; and;
      a zeolite system comprising particles of a first zeolite and particles of a second zeolite placed in the cable core, the first zeolite having a $SiO_2/Al_2O_3$ ratio higher than 5 and equal to or lower than 20, and a maximum diameter of a sphere than can diffuse along at least one of the cell axes directions higher than 5 Å; and the second zeolite having a $SiO_2/Al_2O_3$ ratio of 5 at most, and a maximum diameter of a sphere than can diffuse along at least one of the cell axes directions of from 3 Å to 5 Å;
   (b) heating the power cable core up to a temperature causing migration of the crosslinking by-products and water molecules from the crosslinked electrically insulating system to the zeolite system, thereby the crosslinking by-products are absorbed by the particles of the first zeolite and the water molecules are absorbed by the particles of the second zeolite;
   (c) placing a metal screen around the power cable core.

13. Method according to claim 12, wherein the heating step is carried out at a temperature of from 70° C. to 80° C., for a time from 7 to 15 days.

14. Method according to claim 12, wherein the heating step causes at least one fraction of the crosslinking by-products to be irreversibly absorbed into the particles of the first zeolite and at least one fraction of the water molecules to be irreversibly absorbed into the particles of the second zeolite.

* * * * *